United States Patent [19]

Harvey

[11] Patent Number: 4,687,645
[45] Date of Patent: Aug. 18, 1987

[54] COMPOSTING UNIT

[76] Inventor: Christian D. Harvey, 1209 W. Lake Ave., Baltimore, Md. 21210

[21] Appl. No.: 427,880

[22] Filed: Sep. 29, 1982

[51] Int. Cl.⁴ ............................................. B01J 1/00
[52] U.S. Cl. .................................. 422/184; 422/209; 71/9
[58] Field of Search ................ 435/287, 313; 422/184, 422/209; 71/9

[56] References Cited

U.S. PATENT DOCUMENTS

| | | |
|---|---|---|
| 1,543,154 | 6/1925 | Fox et al. |
| 3,054,663 | 9/1962 | Komline |
| 3,837,810 | 9/1974 | Richards et al. ...................... 71/9 X |
| 3,853,480 | 12/1974 | Kaelin ................................... 71/9 X |
| 3,890,129 | 6/1975 | Chester ...................................... 71/9 |
| 3,942,769 | 3/1976 | Whiteside et al. ................. 259/81 R |
| 4,169,878 | 10/1979 | Etherington ........................... 71/9 X |

Primary Examiner—Ferris H. Lander
Attorney, Agent, or Firm—John F. McClellan

[57] ABSTRACT

An aerobic digestor for rapidly and efficiently composting waste vegetation and the like has a rotatable drum mounted on a horizontal transverse axis at the midpoint of the length on a frame spacing it above the ground a distance sufficient for rotation; a fixed end of the drum mounts a perforate tube coaxially in the drum between the ends and holes in the fixed end and the removable end of the drum admit air for composting to the perforate tube through adjustable shutters; material being composted in the drum receives air through the tube perforations and may be end-for-ended periodically with the drum at which time the shutter on the end being lowered may be closed to force air up through the dropping charge of waste material.

1 Claim, 6 Drawing Figures

COMPOSTING UNIT

FIELD OF THE INVENTION

This invention relates to an improved design for the aerobic decomposition of organic waste materials.

BACKGROUND OF THE INVENTION

Previous designs to date have required considerable pretreatment, or have not allowed adequate aeration of the waste materials to promote rapid degradation, or have done so with exceedingly complex designs.

Fox, et al, U.S. Pat. No. 1,543,154 issued on 6-23-25, realize the need for pregrinding waste materials, but do so to a finely divided state. In addition, materials are suspended in water after grinding for conveyance to a large central tank, where solids and liquids are then separated. This design requires six months for the degradation of materials.

Komline, U.S. Pat. No. 3,054,663 issued on 9-18-62, uses a hollow drum with open ends, rotated on the longitudinal axis held horizontal, and employs axially extended vanes powered by cables, pulleys and electric motor to provide tumbling and agitation. While achieving the necessary aeration for rapid decomposition of waste organic materials, this design is very complex and separates materials into compartments.

Chester, U.S. Pat. No. 3,890,129 issued on 6-17-75, uses a wash drum rotated on the longitudinal axis, held horizontal. While providing a degree of agitation, this device does not allow sufficient aeration since it must be covered with a shroud on the sides and ends to prevent the composted material from falling out, and precipitation from getting in, thus leaching out nutrients. In addition, collection of the composted material is difficult in that it must be discharged through the mesh with the shroud removed while rotating.

Whiteside et al, U.S. Pat. No. 3,942,769 issued on Mar. 9, 1976 employ a drum rotated on the longitudinal axis, held horizontal, again allowing a degree of agitation of the waste materials to be composted. In this design, a door is provided in the cylinder wall to provide for insertion and removal of materials. However, this design also fails at providing the degree of aeration through the material to be composted which is essential to rapid decomposition.

Rotating a horizontal cylinder on the longitudinal axis provides some mixing of the composting material in that the material tends to flow by gravity when the angle of repose is exceeded. This agitation, however, is gentle and not conducive to thorough mixing of the composting material.

In addition to the above, tumbling (end-over-end) type milk churns are known.

SUMMARY OF THE INVENTION

In accordance with this invention, rotating a cylinder about a transverse horizontal axis, however, provides extensive mixing in that the entire load falls abruptly as the cylinder is inverted. This type of agitation will significantly increase the level of mixing of the compost and thereby decrease the time required for decomposition.

The proposed aerobic composter design hereafter described will according the the objects of this invention provide what previous aerobic composters have been unable to provide. This includes:

1. complete aeration of the organic waste material to be decomposed by aerobic bacteria;
2. complete inversion and mixing of the composting material at regular intervals;
3. control of the heat generated by the decomposing waste material;
4. simplicity of design
5. reduction in overall costs of materials employed in the aerobic composter.

The following criteria are recognized as being essential to rapid decomposition of organic waste material:

1. Particle Size - pregrinding of the material to be composted yields a greater surface area for aerobic bacteria to work with.
2. Aeration - introduction of air throughout the material to be composted provides faster doubling time of the bacteria involved in aerobic degradation.
3. Temperature - while the aerobic bacteria will generate heat during the decomposition of the waste materials, control of the temperature within a certain range (100°-150°) provides optimum conditions for the bacteria to survive and multiply, while destroying weed seeds and harmful organisms.
4. Agitation - turning the waste materials daily allows all the materials to be subjected to the degradation action of the bacteria, and to the temperature required to destroy noxious seeds and organisms.
5. Moisture - waste materials should be maintained in a moist condition, never soaking wet (allowing leaching of nutrients) or too dry (preventing microbial action).

The composting unit comprises a cylindrical container mounted in an elevated position on a stand for rotation about a substantially horizontal transverse axis. The cylindrical container has within it a central perforated tube also rotating with the cylinder and blocked at the midpoint to promote pumping. The end caps of the central tube are provided with rotating covers along the horizontal axis to control pumping and other aeration, and temperature. One end of the cylinder is removable to allow insertion of materials to be composted and removal of materials that have been composted.

BRIEF DESCRIPTION OF THE DRAWING FIGURES

The invention will be better understood by reference to the accompanying figures.

DETAILED DESCRIPTION

Figure 1:
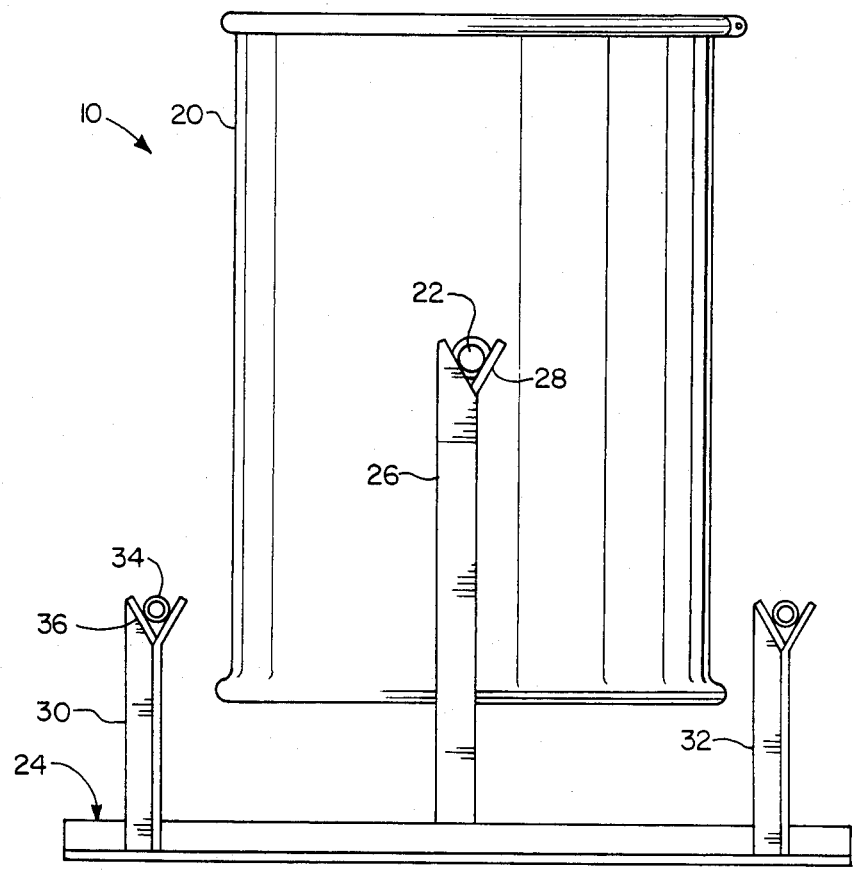
FIG. 1 is a side elevational view of the invention with the rotating drum in a vertical orientation.

FIG. 1 shows the invention in embodiment 10, as having a rotatable drum 20 with a pair of surface-mounted transverse coaxial axles 22 at mid-length horizontally mounted on a stand or base 24 by means of a pair of uprights 26 with "Y"-shaped upper ends 28. The base spaces the drum from the ground a distance permitting end-for-end rotation.

The base also includes a second and a third pair of similar uprights 30, 32 spaced at opposite ends of the base for holding the rotatable drum in horizontal orientation when desired by means of a respective length of pipe 34 removably held in the "Y"-shaped upper ends 36 of each pair. The base may be of bolt-assembled angle iron or may be welded.

Figure 2:
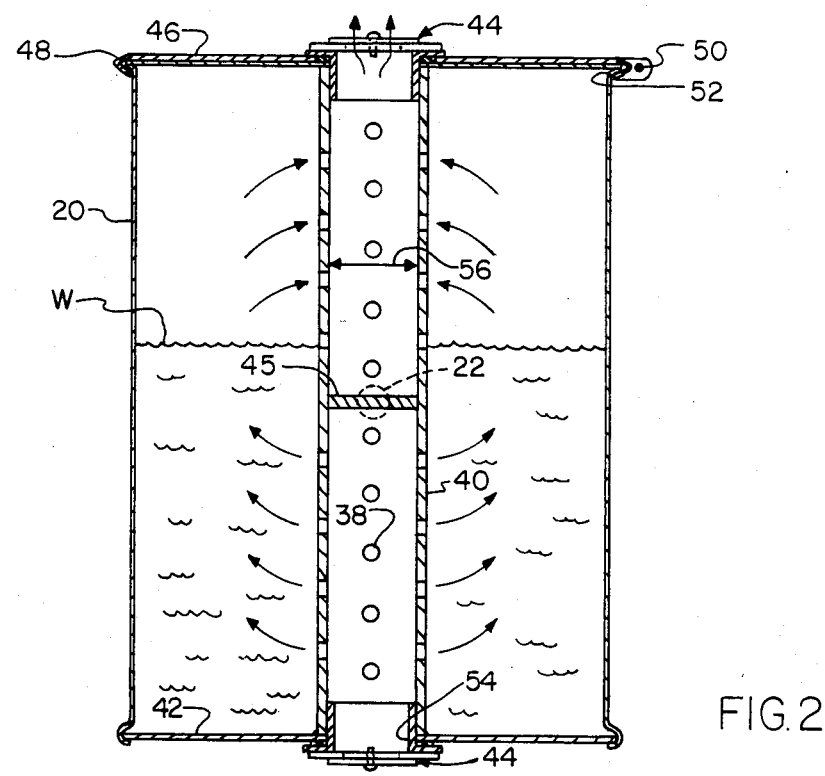
FIG. 2 is a sectional detail of the rotating drum in a vertical orientation.

FIG. 2 shows a further provision of the rotatable drum 20 which aerates (arrows) organic material such as waste vegetation W in the drum through perforations 38 in a coaxial perforate tube 40. The perforate tube may be welded or otherwise held to the fixed end 42 of the rotatable drum. Air admitted through an adjustable louvre or shutter 44 at the bottom permeates the organic waste W and gases escape at another of the adjustable louvres or shutters 44 on the opposite end of the perforate tube.

Periodically the rotatable drum 20 may be end-for-ended, promoting further mixing and aeration of the partial (two-thirds to three quarters filled) load and causing moisture in it to cycle through it again, in the opposite direction.

The perforate tube may have a plug or block 45 of wood or sheet metal at the midpoint, forcing air pumped, as result of dropping a charge of waste material, to permeate the waste material.

The adjustable shutter at the lowering end may be closed to force the air back up through the waste, and then opened. If both shutters are closed, the dropping charge will create reduced pressure at the upper end, promoting upward air pumping.

When composting is complete, the removable end 46 of the drum (upper end in the Figure) is removed, and the drum 20 is oriented horizontally for emptying and re-filling. Alternatively it may be oriented downwardly to dump the compost into a suitable receptacle such as a large box or tray.

The rotatable drum 20 may be a standard fifty-five gallon (or larger) steel barrel, with conventional interrupted "V"-section strap 48 conventionally clamping the removable end 46 by means of the usual bolt 50 drawing flanges (52 shown) together at the interruption. The "V"-section strap is an example. Any other suitable commercial closure can be used.

Modifications necessary in converting a steel barrel are few and economical: a hole 54 the diameter of the perforate steel tubing bore 56 is formed in the fixed end 42 and similarly in the removable end 46, and the perforate steel tube 40 is fixed to the fixed end 42. There preferably are no other holes in the drum. Tube 40 can be of PVC.

The stub axles 22 are welded or screwed on the exterior and the drum modification is complete.

The adjustable shutters 44 may be identical and may be installed after the rotatable drum 20 is mounted on the base and loaded with compost and the removable drum end 46 closed.

Figure 3:
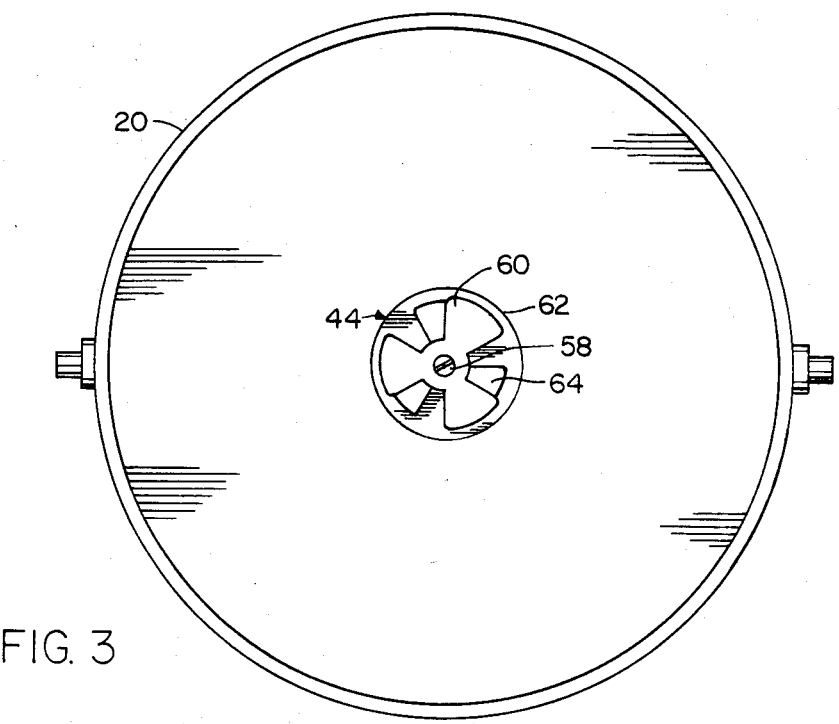
FIG. 3 is an axial view of the rotating drum on a larger scale.

FIG. 3 is an end view detail of the rotatable drum showing details of an adjustable shutter 44 which includes a screw 58 pivotally mounting a lobed closure 60 to a circular plate 62 having apertures 64 proportioned for adjustable closing by rotation of the lobed closure.

Figure 4:
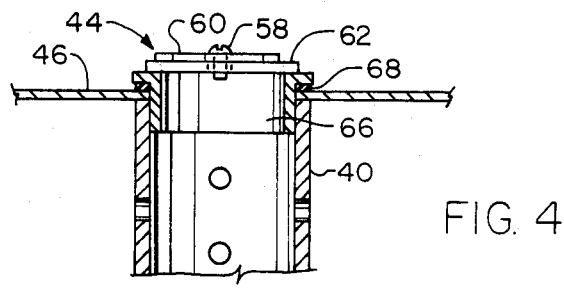
FIG. 4 is a partly sectional detail of the upper end of the rotating drum as viewed in FIG. 2.

FIG. 4 details the typical mounting of the shutters 44 each of which has an integral cylindrical sleeve 66 proportioned for friction-fit retention in the bore of the perforate tube 40. A rubber gasket 68 may be used between the plate 62 and the end (removable end 46 shown) of the rotatable drum. Elements 62 and 66 are integral.

The removable-end 46 assembly detail is also shown and is similar to the fixed-end assembly detail except for the lack of welding or other affixation of the perforate tube 40, which abuts the inner face of each end of the drum.

Figure 5:
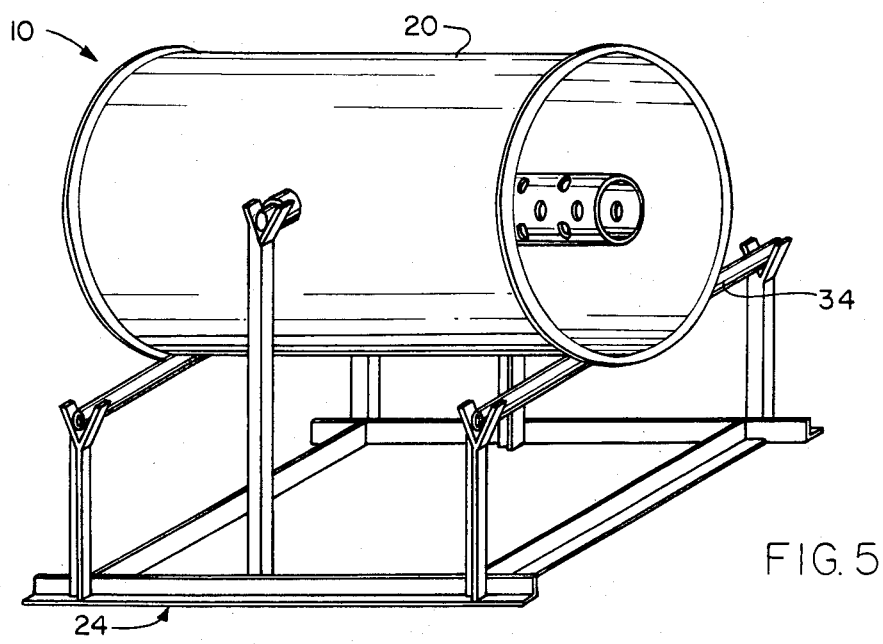
FIG. 5 is a perspective view with an end of the rotating drum removed.

FIG. 5 shows the rotatable drum 20 safely and stably supported on the base 24 in convenient horizontal position for loading, unloading, inspection or cleaning, by the lengths of pipe 34 at each end.

Figure 6:
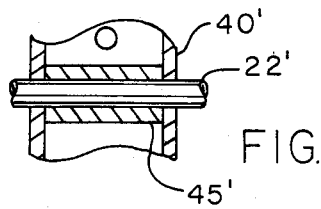
FIG. 6 is a sectional alternative detail.

FIG. 6 shows that the axle 22' may alternatively pass through the unit and secure the perforate tube 40' in place. For this it may pass through block 45' also.

The axle 22' can be held at the ends in a similar manner to the stub axles.

From the foregoing it will be appreciated that operation of the invention is efficient and is safe. The drum will be stable in the vertical position when the load drops to one end and will not tend to roll back, as with drums rotatable about the long axis.

It will be appreciated also that the system employs a minimum of parts, made economically to coarse tolerances, of readily available mild steel or the like; that it can safely be embodied in a variety of sizes, that it is lightweight, easily assembled, disassembled and maintained, takes up little space in use, can be stored compactly, and is unobtrusive in appearance. As an alternative, PVC tubing can be used.

As a further alternative, the adjustable louvre or shutter assemblies 44 can be screwed into the perforate tube for positive engagement if desired.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system employing a drum with holes in it for composting waste material such as vegetation, aided by means for rotating the drum on a stand, the drum having means for loading waste material to be composted and for removing compost, the improvement comprising: the drum being cylindrical, means permitting cyclically dropping a charge of waste material from one end of the drum to the other through said rotating, including transverse axle structure at the drum circumference and means on the stand for rotatably holding said transverse axle structure in substantially horizontal orientation for rotating said drum end-over-end, means for admitting air to said charge of waste material, including a perforate tube extending between a first hole in a first end of the drum and a second hole in a second end of the drum, means for forcing air, from said means for admitting air, through said charge of waste material as result of said dropping, the means for forcing air including a blockage intermediate the length of said perforate tube, the means for forcing air further including a first adjustable shutter on a first end of said perforate tube and a second adjustable shutter on a second end of said perforate tube, said perforate tube being fixed to said first end of the drum, said first end of the drum being fixed as part of the drum, and said means for loading waste material to be composted and for removing compost comprising said second end of the drum being removable.

* * * * *